United States Patent
Platko et al.

(10) Patent No.: US 6,282,626 B1
(45) Date of Patent: Aug. 28, 2001

(54) NO STALL READ ACCESS-METHOD FOR HIDING LATENCY IN PROCESSOR MEMORY ACCESSES

(75) Inventors: John J. Platko, Acton; Paul Chieffo, Bolton, both of MA (US)

(73) Assignee: 3Com Corporation, Santa Clara, CA (US)

( * ) Notice: Subject to any disclaimer, the term of this patent is extended or adjusted under 35 U.S.C. 154(b) by 0 days.

(21) Appl. No.: 09/465,891

(22) Filed: Dec. 17, 1999

Related U.S. Application Data

(60) Provisional application No. 60/143,870, filed on Jul. 15, 1999.

(51) Int. Cl.[7] .................................................. G06F 12/08
(52) U.S. Cl. ........................ 711/209; 711/204; 711/137; 711/169
(58) Field of Search ................................. 711/3, 137, 169, 711/203, 204, 209, 213; 712/206, 207, 219

(56) References Cited

U.S. PATENT DOCUMENTS

| | | | |
|---|---|---|---|
| 5,623,636 | * 4/1997 | Revilla et al. ...................... 711/163 |
| 5,848,254 | * 12/1998 | Hagersten ............................ 712/207 |
| 5,864,692 | * 1/1999 | Faraboschi et al. .................. 712/216 |
| 5,884,027 | * 3/1999 | Garbus et al. ....................... 709/250 |
| 5,983,306 | * 11/1999 | Corrigan et al. ..................... 710/129 |

* cited by examiner

Primary Examiner—Do Hyun Yoo
Assistant Examiner—Gary J. Portka
(74) Attorney, Agent, or Firm—Weingarten, Schurgin, Gagnebin & Hayes LLP

(57) ABSTRACT

The memory space accessible by a processor is partitioned such that multiple memory regions map to the same physical memory. Processor accesses in one of the regions are regarded as normal accesses, and are satisfied from the memory or a read buffer. If memory access is required, the processor is stalled until the desired data is returned from the memory. Processor accesses to the other region are regarded as requests to prefetch the data from the memory and place it into a read buffer without stalling the processor. The processor continues program execution while the data is being prefetched. At a later point in program execution, the processor requests the data via the first region. The data likely resides in the read buffer, and can therefore be provided to the processor quickly, resulting in improved performance.

12 Claims, 3 Drawing Sheets

| Address Range | | Size | Description | Access Type |
|---|---|---|---|---|
| 0x0000_0000 | 0x000F_FFFF | 1 MB | Internal Rom | burst, stall |
| | | | | |
| 0x0130_0000 | 0x1FFF_FFFF | | reserved 120 | burst, stall |
| 0x2000_0000 | 0x200F_FFFF | 1 MB | Internal ROM | burst, no stall |
| 0x2130_0000 | 0x3FFF_FFFF | | reserved 122 | burst, no stall |
| 0x4000_0000 | 0x400F_FFFF | 1 MB | Internal ROM | single, stall |
| 0x4130_0000 | 0x5FFF_FFFF | | reserved 124 | single, stall |
| 0x6000_0000 | 0x600F_FFFF | 1 MB | Internal ROM | single, no stall |
| 0x6130_0000 | 0x7FFF_FFFF | | reserved 126 | single, no stall |
| 0x8000_0000 | 0x9FFF_FFFF | .5GB | processor core Data RAM (DARAM) 114 | |
| 0xA000_0000 | 0xAFFF_FFFF | .25GB | processor core Data RAM (DARAM) snoop buffer 116 | |
| 0xB000_0000 | 0xBFFF_FFFF | .25GB | Int. vec & clear reg. | |
| 0xC000_0000 | 0XFFFF_FFFF | 1GB | processor core Instruction RAM (IRAM) | |

*Fig. 3*

NO STALL READ ACCESS-METHOD FOR HIDING LATENCY IN PROCESSOR MEMORY ACCESSES

CROSS REFERENCE TO RELATED APPLICATIONS

This application claims the benefit under 35 U.S.C. §119 (e) of provisional patent application no. 60/143,870, filed Jul. 15, 1999 and entitled "No Stall Read Access—A Method For Hiding Latency In Processor Memory Accesses".

BACKGROUND OF THE INVENTION

The invention is related to the field of processors, and more specifically to techniques for reducing memory access time in processing systems in order to improve performance.

In processing systems, it is typical to provide a processor coupled to a memory in which data used by the processor are stored. During the execution of a program, the processor accesses the memory in order to store or retrieve data. It is generally desirable that the memory have a sufficiently fast access time so that processing power is not wasted waiting for memory operations to complete. However, this goal must be balanced against other needs of the processing system. The memory also must be large enough to store sufficient data to minimize the performance impact of input/output (I/O) operations, which are extremely slow as measured in execution cycles of the processor. Also, the memory must generally be accessible to other entities, such as DMA controllers used to perform I/O operations. Memories that satisfy these other needs generally exhibit greater latency, or access time, than needed to achieve the best possible processing performance from a system.

There are known techniques for reducing the average access time of memory in a processing system. According to one technique, one or more read buffers having fast access time are placed near the processor, and are also coupled to the memory. When the processor makes a request for a word of data, a block of multiple words including the desired word is requested from memory. When the block is returned, the desired word is given to the processor, and the remainder of the block is stored in a read buffer. Subsequent processor requests for data words in the block are satisfied from the read buffer, and therefore are satisfied much more quickly than if additional requests to the system memory were required.

Although overall performance can thus be improved by using read buffers, there is still a performance limitation caused by the access time for data blocks. It would be desirable to further reduce average memory latency in order to achieve greater performance in processing systems.

BRIEF SUMMARY OF THE INVENTION

In accordance with the present invention, a processing system is disclosed in which average memory latency can be further reduced below that of a system using read buffers alone.

In the disclosed processing system, the memory space accessible by the processor is partitioned such that multiple memory regions map to the same physical memory. Processor accesses in one of the regions are regarded as normal accesses, and are satisfied from the memory or a read buffer. If a memory access is required, the processor is stalled in a normal fashion until the desired data word is returned from the memory. Processor accesses to the other region are regarded as implied requests to prefetch the data from the memory and place it into a read buffer without stalling the processor. The processor is free to engage in useful activity while the data is being prefetched. At a later point in program execution, when the data is requested via the first region, the data likely resides in the read buffer, and thus can be provided to the processor very quickly. Thus, the processor is not required to wait while data is being obtained from the memory, so overall performance is improved.

Other aspects of the present invention will be apparent from the detailed description below.

BRIEF DESCRIPTION OF THE SEVERAL VIEWS OF THE DRAWING

FIG. 3 is a drawing of a memory map for the processor of FIG. 2.

DETAILED DESCRIPTION OF THE INVENTION

Figure 1:
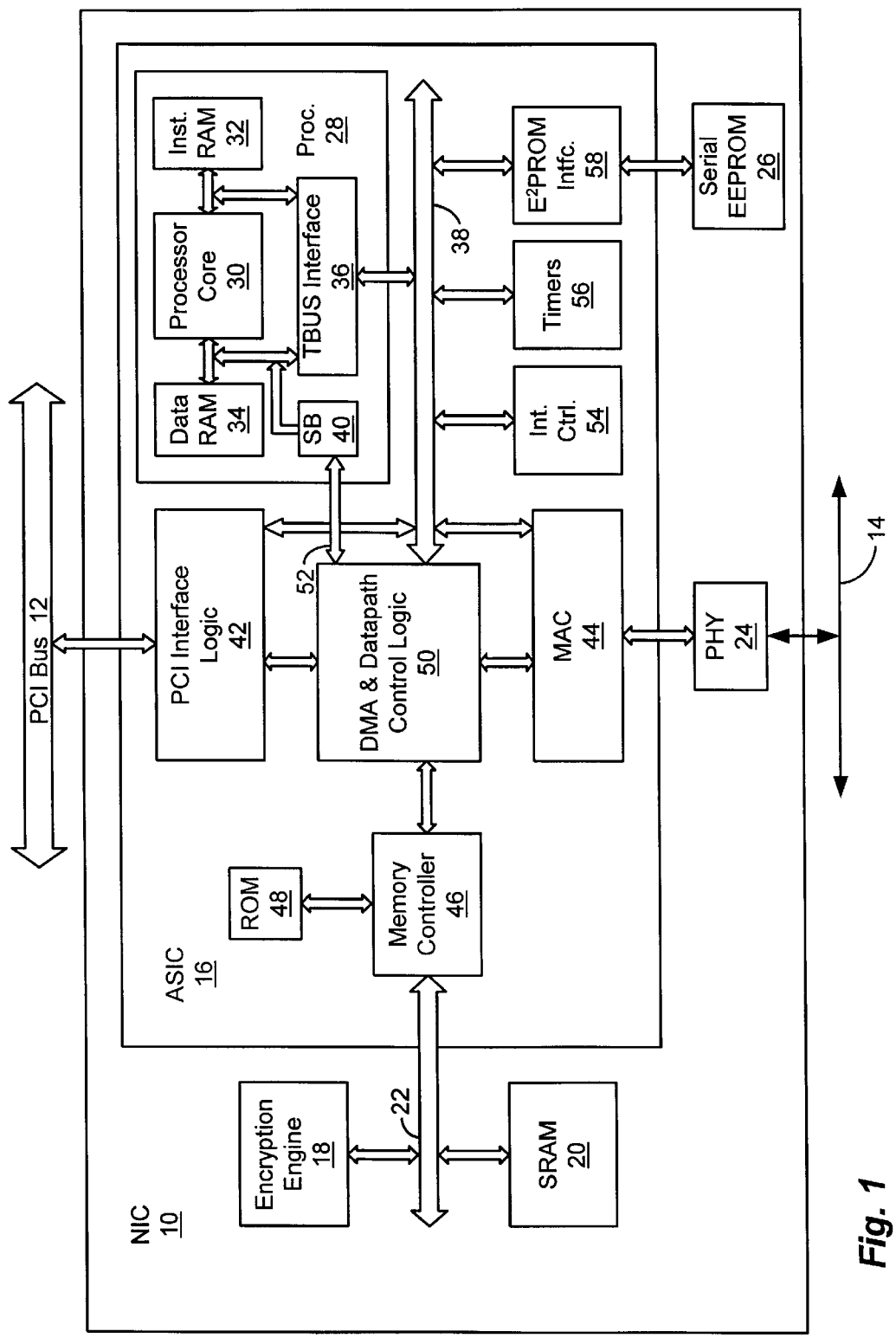
FIG. 1 is a block diagram of a network interface card (NIC) having a processor operating according to the present invention.

FIG. 1 shows a block diagram of a network interface card (NIC) 10. As shown, the NIC 10 is intended for connection between a system I/O bus, such as a Peripheral Components Interconnect (PCI) bus 12, and an Ethernet network segment 14. The NIC 10 includes an application-specific integrated circuit (ASIC) 16 having an internal structure described below. The ASIC 16 is connected to static random access memory (SRAM) 20 by a memory bus 22. An optional encryption engine co-processor 18, which in one embodiment can be the so-called Sidewinder IC from VLSI Technology, Inc., of San Jose, Calif., can also be connected to the memory bus 22. The ASIC 16 is also connected to PHY circuitry 24 that implements a physical layer interface to the Ethernet segment 14. An electrically erasable programmable read only memory (EEPROM) 26 is also connected to the ASIC 16.

The ASIC 16 is a highly integrated processing subsystem specially tailored for network interface applications. It includes a processor 28, which in a preferred embodiment employs a processor core 30 known as the ARM9, developed by ARM, Ltd. of Cambridge, England. The processor 28 includes an instruction RAM 32, a data RAM 34, and interface logic 36 for interfacing to an internal data bus 38 referred to as the "T Bus". The processor 28 also contains a 512 byte buffer 40 referred to as a "snoop buffer" or SB, which is described below.

The ASIC 16 also contains PCI interface logic 42 for interfacing to the external PCI bus 12, and media access control (MAC) logic 44 for interfacing to the external PHY logic 24. As shown, the PCI interface logic 42 and MAC logic 44 have connections to the T Bus 38. A memory controller 46 controls the SRAM 20 and the memory bus 22, and also controls access to an on-chip read only memory (ROM) 48. Direct memory access (DMA) and datapath control logic 50 provides connectivity and data movement among the PCI interface logic 42, MAC 44, memory controller 46, and T Bus 38. The DMA and datapath control logic 50 is also connected to the snoop buffer 40 by a separate bus 52. The ASIC 16 also includes interrupt control logic 54, timer logic 56, and $E^2$PROM interface logic 58 connected to the T Bus 38. The $E^2$PROM interface logic provides an interface to the off-chip EEPROM 26.

The T Bus 38 uses separate 32-bit unidirectional buses for data movement to and from connected elements. More specifically, three 32-bit buses carry data from the processor 28 to the PCI interface logic 42, the DMA and datapath control logic 50, and the MAC logic 44 respectively. Also, three 32-bit buses carry data to the processor 28 from respective ones of these logic blocks. The processor 28 is the only "master" on the T Bus 38, meaning that it is the only device that can initiate data transfers. The PCI interface logic 42, the DMA and datapath control logic 50, and the MAC logic 44 all interface to the T Bus 38 as slave devices, as do the interrupt control logic 54, the timer logic 56, and the E²PROM interface logic 58.

The NIC 10 of FIG. 1 operates generally to move packets between the network segment 14 and a host memory that is accessible via the PCI bus 12. All packets either transmitted or received are temporarily buffered in the SRAM 20. The host system communicates with the NIC 10 via data structures referred to as "rings" residing in host memory. Similarly, the processor 28 controls the movement of packets into and out of the SRAM 20 using rings residing in the SRAM 20.

For packets being transmitted, a transmit DMA controller within the DMA and datapath logic 50 is programmed by the processor 28 to obtain a packet and an accompanying packet descriptor from a ring in host memory, and transfer the packet and descriptor to a ring in the SRAM 20. As part of this operation, the DMA controller can load the snoop buffer 40 with data that is being downloaded from the host memory to the SRAM 20. In particular, the DMA controller is programmed to load descriptors into the snoop buffer 40 as they are being transferred from the host into the SRAM 20. This feature enhances performance by enabling the processor to have fast access to descriptors.

Once these items have been transferred to the SRAM 20, the processor 28 examines the descriptor and decides what to do with the packet. Any of a variety of functions may be performed, including for example adding a Virtual Local Area Network (VLAN) tag to the packet, or performing a filtering operation so that only selected packets from the host are sent on the Ethernet segment 14.

For packets to be transmitted to the Ethernet segment 14, the processor 28 builds a new descriptor pointing to the packet data already in the SRAM 20, places the descriptor on a ring in the SRAM 20 used for outgoing packets, and programs a DMA engine within the DMA and datapath logic 50 to transfer the packet to the MAC 44. The MAC 44 transfers the packet data to the PHY circuitry 24, which transmits the packet as a series of bits on the Ethernet segment 14.

For packets received from the Ethernet segment 14, the processing is generally the reverse of that described above. The DMA and datapath logic 50 includes separate receive DMA engines that are responsible for moving packets from the MAC to the SRAM 20, and for moving packets and descriptors between the SRAM 20 and the host memory residing on the PCI bus 12. The processor 28 examines the descriptors of received packets to perform any special processing that may be required and to decide whether the packet is to be passed on to the host. For example, the processor 28 may implement some type of filtering for received packets, so that packets are selectively dropped rather than being forwarded to the host.

Figure 2:
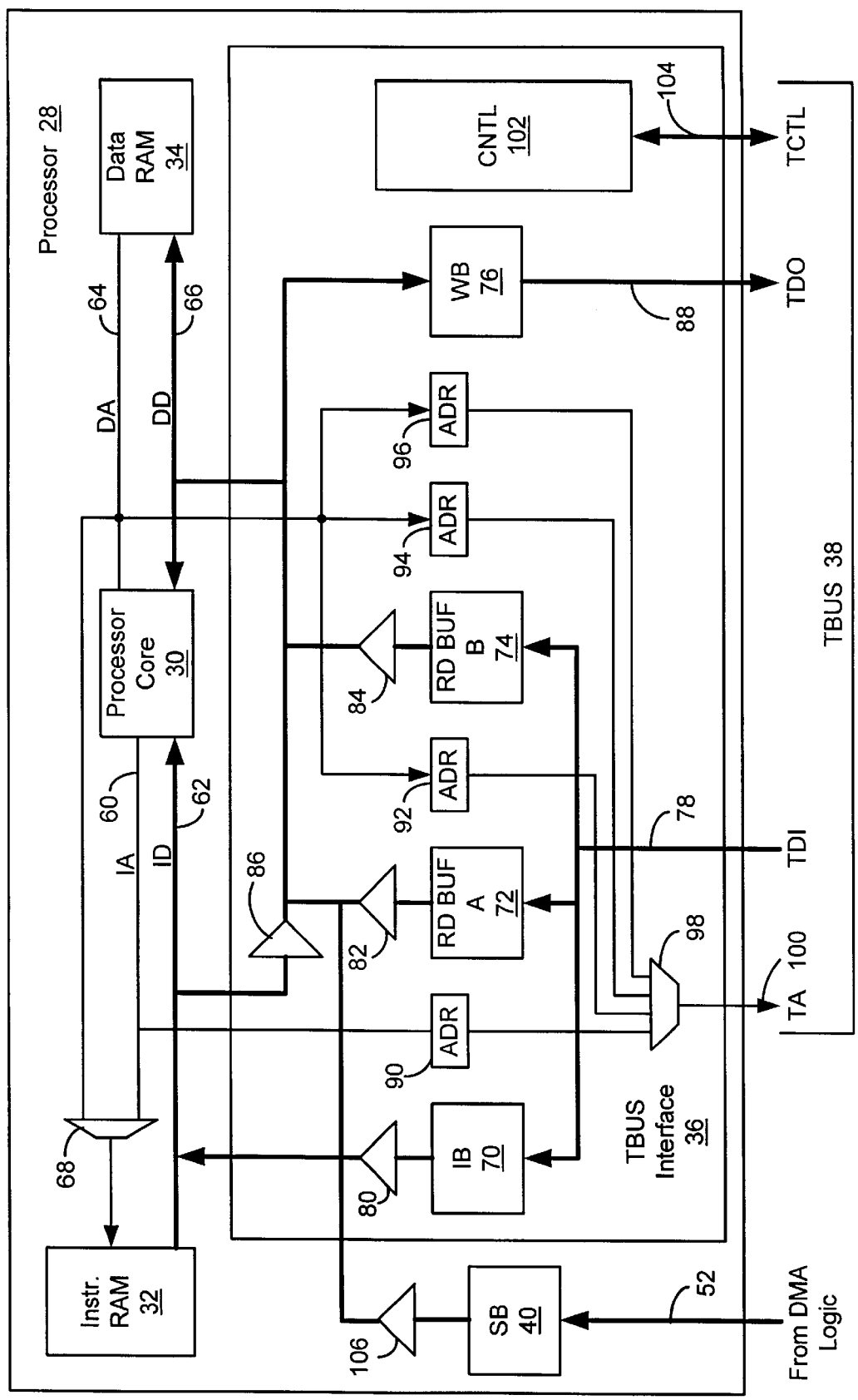
FIG. 2 is a block diagram of the processor in the NIC of FIG. 1.

FIG. 2 shows the processor 28 in more detail. The processor core 30 interfaces with the instruction RAM 32 via an instruction address (IA) bus 60 and an instruction data (ID) bus 62. Also, the processor core 30 interfaces with the data RAM 34 via a data address (DA) bus 64 and a data data (DD) bus 66. The DD bus 66 is connected as a data input to the instruction RAM 32, and a multiplexer 68 is used to select either the IA bus 60 or the DA bus 64 as the source of the address to the instruction RAM 32. This configuration enables the processor core 30 to load operational code into the instruction RAM 32 by performing data store operations into an appropriate address space.

The T Bus interface logic 36 includes an 8-entry instruction prefetch buffer (IB) 70, two 8-word read buffers labeled read buffer A (RD BUF A) 72 and read buffer B (RD BUF B) 74, and a 4-word write buffer (WB) 76. The IB 70 and the read buffers 72 and 74 are loaded from a T Bus Data In (TDI) bus 78. The output of the IB 70 can be selectively driven onto the ID bus 62 via a bus driver 80. The outputs of the read buffers 72 and 74 can be selectively driven onto the DD bus 66 via respective bus drivers 82 and 84. Also, the value on the ID bus 62 can be selectively driven onto the DD bus 66 via a bus driver 86, a function that is used when executing instructions that contain immediate data. The WB 76 is loaded from the DD bus 66, and provides its output to the T Bus 38 on a T Bus Data Out (TDO) Bus 88.

The IB 70, read buffers 72 and 74, and WB 76 have associated address registers 90, 92, 94 and 96 respectively that are used to temporarily store address values when reading or writing data to/from the T Bus 38. As shown, the IB address register 90 is loaded from the IA bus 60, while the remaining three address registers 92, 94 and 96 are loaded from the DA bus 64. The outputs of these address registers are provided as inputs to a multiplexer 98, whose output is provided to the T Bus 38 on a T Bus Address (TA) bus 100. The address register 96 associated with the WB 76 contains multiple storage locations, one for each of the four entries in the WB 76. The address and data from a given store operation advance together through the address register 96 and WB 76 until written to the TBUS 38 as part of a corresponding write transaction.

The T Bus interface logic 36 also contains control logic 102 that controls the movement of data between the T Bus 38 and the various components such as the IB 70, read buffers 72 and 74, WB 76, address registers 90, 92, 94 and 96, and multiplexer 98. This control logic interfaces to the T Bus 38 via various control lines (TCTL) 104. These control lines carry signals such as a clock, a request signal for initiating data transfers, an acknowledge signal for completing transfers, byte enable signals for performing sub-word transfers, and signals indicating whether a transfer is a read or write and whether a single word or a burst of multiple words are involved.

Also shown in FIG. 2 is the snoop buffer 40, which is loaded from the bus 52 from the DMA and datapath logic 50 of FIG. 1. The output of the snoop buffer 40 is selectively driven onto the DD bus 66 via a bus driver 106, so that data from the snoop buffer 40 can be transferred to the data RAM 34 as part of a write transaction.

FIG. 3 shows a memory map indicating the manner in which various segments of the 4 GB address space of the processor core 30 are used. This address space is shared by instructions and data. The memory map is designed to facilitate single cycle access to the instruction RAM 32 and the data RAM 34, and to enable flexible access to resources connected to the T Bus 38.

Referring to FIG. 3, an address region 110 occupying the top 1 GB of the processor address is used for instructions stored in the instruction RAM 32. Bits [31:30] of the address must decode as 11 binary to access the region 110. Bits [16:2] of the address are provided as the address to the instruction RAM 32, and bits [29:17] are ignored. Therefore, the instruction RAM 32 aliases throughout the address region 110.

The next-lower 1 GB address region 112 is used for data stored in the data RAM 34. Bits [31:30] of the address must decode as 10 binary to access the region 112. Bits [12:2] of the address are used to address the data RAM 34. Bit [29] selects either an upper half 116 or a lower half 114 of the region 112, to identify whether transfers involve the snoop buffer 40 as described below. Bits [28:13] are ignored. Therefore, the data RAM 34 aliases throughout the address region 112.

Accesses to the lower region 114 of the region 112 are treated as normal accesses, i.e., data is either written to or read from the data RAM 34 at the address specified by address bits [12:2]. Writes to the upper region 116 cause the first word of the snoop buffer 40 to be written into the data RAM 34 at the address specified by address bits [12:2]. Also, the snoop buffer is "popped", i.e., the contents are moved forward by one location, to bring the next sequential word to the front for subsequent transfer to the data RAM 34. As shown, this functionality is available in only the lower half of the upper region 116, i.e., when address bit [28] equals 0. The upper half of the region 116 is used for interrupt control functions.

The bottom 2 GB region 118 is used for accesses to the T Bus 38. The T Bus interface logic 36 detects accesses to this region, and for each access takes one of several possible actions depending on whether the access is an instruction access, a data store (write), or a data load (read). These scenarios are discussed in turn below.

When the processor core 30 generates an address on the IA bus 60 that falls in the T Bus address region 118, the address is compared with the address stored in the instruction buffer address register 90 to determine whether the instruction resides in the IB 70. If so, the instruction is returned to the processor core 30 on the ID bus 62. If not, the processor core 30 is stalled, the new address is loaded into the address register 90, and a T Bus read transaction is performed to obtain an aligned 8-word block that contains the desired instruction.

It will be noted that the address region 118 is divided into four equal-sized sub-regions 120, 122, 124 and 126. The physical memory in the region 118 is aliased in all four sub-regions 120, 122, 124 and 126, i.e., the same physical data can be accessed in any one of these four regions. For instruction accesses, operation of the TBUS interface logic 36 is the same. Within each sub-region, the lowest 1 MB is allocated for accesses to the ROM 48 of FIG. 1. Thus, depending on the address of the request, the block that is the subject of the T Bus read transaction may be obtained from the ROM 48, or from the off-chip SRAM memory 20. In either case, when the 8-word block has been returned and loaded into the IB 70, the desired instruction is returned to the processor core 30 via the ID bus 62, and the processor core 30 is unstalled so that program execution can resume.

When the processor core 30 performs a store operation in address region 118, the data and address are stored in the WB 76 and address register 96 if not full. If the WB 76 and address register 96 are full, the processor core 30 is stalled until at least one entry in the WB 76 and address register 96 has become empty. At such time, the data and address are stored in the WB 76 and address register 96, and the processor core 30 is unstalled. Whenever the WB 76 and address register 96 are non-empty, the T Bus interface logic 36 generates a write transaction on the T Bus 38 to write the data at the front of the WB 76 into the off-chip SRAM 20 at the address at the front of the address register 96. All T Bus writes are one word in length.

When the processor core 30 performs a load operation in address region 118, the data is returned via one of the two read buffers 72 or 74. Operation varies depending on several factors. One factor is the address. Accesses to the different subregions of the region 118 are classified as follows:

| Sub-region 120 | Burst, stall |
| sub-region 122 | Burst, no stall |
| Sub-region 124 | Single, stall |
| Sub-region 126 | Single, no stall |

A "burst" access results in an aligned 8-word block being obtained from the T Bus 38 and stored into one of the read buffers 72 or 74. In contrast, a "single" access involves only a single word or smaller data unit. The "stall" access is a normal data request, in response to which the T Bus logic 36 stalls the processor core 30 until the requested data is available in a read buffer 72 or 74. In contrast, "no stall" accesses are artificial requests used to signal the T Bus interface logic 36 that a word or a block should be prefetched and placed in one of the read buffers 72 or 74. These different operations are described in turn below.

For load operations in the (Single, stall) space 124, the read buffers 72 and 74 are checked to determine whether either one holds the requested data. If the data is found in one of the read buffers 72 or 74, the data is returned to the processor core 30 and the buffer is "cleared", i.e., marked "Available".

If the requested data is not in either read buffer 72 or 74, the processor core 30 is stalled. One of the read buffers 72 or 74 is then allocated to receive the requested data from the SRAM 20. Each read buffer 72 and 74 has an associated state, which may be "Busy" or "Available". The allocation of a read buffer 72 or 74 for a given request depends on their respective states as follows:

| Read Buffer A | Read Buffer B | Selection |
| --- | --- | --- |
| Available | Available | Read Buffer A |
| Busy | Available | Read Buffer B |
| Available | Busy | Read Buffer A |
| Busy | Busy | Read Buffer A is used upon completion of the request that made Read Buffer A busy. |

After one of the read buffers 72 or 74 has been selected, a single word read transaction is initiated on the T Bus 38. After the requested data is returned and stored in the selected read buffer, the buffer is marked valid, the data is returned to the processor core 30, and the processor core 30 is unstalled. Finally, the read buffer that was used for the load is marked "Available".

Load operations in the (Burst, stall) space 120 proceed in the same manner as for operations in the (Single, stall) space 124, except that an aligned 8-word block including the requested data is requested on the T Bus 38 and stored into the selected read buffer 72 or 74. Also, the read buffer is not flushed until the most significant word in the read buffer is accessed by the processor core 30 using a (Single, stall) request. If the address for a (Burst, stall) load operation is for the most significant word in the block, the selected read buffer is flushed as soon as the data is returned to the processor core 30.

Load operations in the (Single, no stall) space 126 cause a read buffer 72 or 74 to be allocated as described above, and also cause a single word read transaction to be initiated on the T Bus 38. However, the processor core 30 is not stalled. The state of the DD bus 66 is undefined. However, it is assumed that the results of this read are not used by the program executing in the processor core 30. Rather, it is expected that at a later time the processor core 30 performs a (Single, stall) request for the same address to actually retrieve the desired data, which in general should reside in one of the read buffers 72 or 74 as a result of the preceding (Single, no stall) operation.

Load operations in the (Burst, no stall) space 122 are similar to those in the (Single, no stall) space 126, except that an aligned 8-word block is requested over the T Bus 38 and placed in the allocated read buffer 72 or 74. The allocated read buffer is not flushed until the most significant word in the buffer is accessed by the processor core 30 using a (Single, stall) operation.

A method for hiding latency in processor memory accesses has been described. It will be apparent to those skilled in the art that modifications to and variations of the above-described technique are possible without departing from the inventive concepts disclosed herein. Accordingly, the invention should be viewed as limited solely by the scope and spirit of the appended claims.

What is claimed is:

1. A method of operating a processing system, comprising:
   determining whether a read address associated with a read request from a processor falls into a first logical address region that maps to a physical address region;
   determining whether the read address falls into a second logical address region that maps to the physical address region;
   determining whether the data associated with the read request resides in a first memory;
   if the read address falls into the first logical address region and the requested data resides in the first memory, then (i) transferring the requested data from the first memory to the processor, and (ii) providing a first signal to the processor indicating that the data is being transferred to the processor in satisfaction of the read request;
   if the read address falls into the first logical address region and the requested data does not reside in the first memory, then (i) initially providing a second signal to the processor indicating that the data is not being transferred to the processor in satisfaction of the read request, (ii) subsequently transferring the requested data from a second memory to the processor, and (iii) upon transferring the requested data to the processor, providing the first signal to the processor indicating that the data is being transferred to the processor in satisfaction of the read request; and
   if the read address falls into the second logical address region, then (i) providing the first signal to the processor indicating that the data is being transferred to the processor in satisfaction of the read request, and (ii) transferring the requested data from the second memory to the first memory.

2. A method according to claim 1, wherein the processor is operative upon assertion of a stall signal to enter a stall condition in which program execution is suspended, and wherein the second signal indicating that data is not being transferred to the processor in satisfaction of the read request comprises the assertion of the stall signal.

3. A method according to claim 1, wherein the first signal indicating that data is being transferred to the processor in satisfaction of the read request comprises the de-assertion of a stall signal.

4. A method according to claim 1, wherein the first and second logical address regions are distinguished from each other by the values of a predetermined number of most significant address bits.

5. A method of operating a processing system, comprising:
   determining whether a read address associated with a read request from a processor falls into a first logical address region that maps to a physical address region;
   determining whether the address of the read request falls within a first logical address sub-region of the first logical address region;
   determining whether the address of the read request falls within a second logical address sub-region of the first logical address region;
   determining whether the read address falls into a second logical address region that maps to the physical address region;
   determining whether the address of the read request falls within a first logical address sub-region of the second logical address region;
   determining whether the address of the read request falls within a second logical address sub-region of the second logical address region;
   determining whether the data associated with the read request resides in a first memory;
   if the read address falls into the first logical address region and the requested data resides in the first memory, then (i) transferring the requested data from the first memory to the processor, and (ii) providing a first signal to the processor indicating that the data is being transferred to the processor in satisfaction of the read request;
   if the read address falls into the first logical address region and the requested data does not reside in the first memory, then (i) initially providing a second signal to the processor indicating that the data is not being transferred to the processor in satisfaction of the read request, (ii) if the read address falls within the first logical address sub-region of the first logical address region, then transferring a block of multiple data words including the requested data from a second memory to the first memory and transferring the requested data to the processor, (iii) if the read address falls within the second logical address sub-region of the first logical address region, then transferring only a single data word including the requested data from the second memory to the first memory and transferring the requested data to the processor, and (iv) upon transferring the requested data to the processor, providing the first signal to the processor indicating that the data is being transferred to the processor in satisfaction of the read request; and
   if the read address falls into the second logical address region, then (i) providing the first signal to the processor indicating that the data is being transferred to the processor in satisfaction of the read request, (ii) if the read address falls within the first logical address sub-region of the first logical address region, then transferring a block of multiple data words including the requested data from the second memory to the first memory, and (iii) if the read address falls within the second logical address sub-region of the first logical address region, then transferring only a single data word including the requested data from the second memory to the first memory.

6. A processing system according to claim 5, wherein the processor is operative upon assertion of a stall signal to enter a stall condition in which program execution is suspended, and wherein the second signal indicating that data is not being transferred to the processor in satisfaction of the read request comprises the assertion of the stall signal.

7. A processing system according to claim 5, wherein the first and second logical address regions are distinguished from each other by the values of a predetermined number of most significant address bits.

8. A processing system according to claim 5, wherein the first memory is a read buffer.

9. A processing system according to claim 8, wherein the read buffer is capable of providing requested data to the processor without requiring the processor to enter a wait state.

10. A processing system, comprising:
a processor operative to issue read requests, each read request containing an address identifying the data being requested;
a first memory coupled to the processor;
a second memory coupled to the first memory and to the processor; and
logic operative to:
determine whether a read address associated with a read request from the processor falls into a first logical address region that maps to a physical address region;
determine whether the read address falls into a second logical address region that maps to the physical address region;
determine whether the data associated with the read request resides in the first memory;
if the read address falls into the first logical address region and the requested data resides in the first memory, then (i) transfer the requested data from the first memory to the processor, and (ii) provide a first signal to the processor indicating that the data is being transferred to the processor in satisfaction of the read request;
if the read address falls into the first logical address region and the requested data does not reside in the first memory, then (i) initially provide a second signal to the processor indicating that the data is not being transferred to the processor in satisfaction of the read request, (ii) subsequently transfer the requested data from the second memory to the processor, and (iii) upon transferring the requested data to the processor, provide the first signal to the processor indicating that the data is being transferred to the processor in satisfaction of the read request; and
if the read address falls into the second logical address region, then (i) provide the first signal to the processor indicating that the data is being transferred to the processor in satisfaction of the read request, and (ii) transfer the requested data from the second memory to the first memory.

11. A processing system according to claim 10, wherein the first signal indicating that data is being transferred in satisfaction of the read request comprises the de-assertion of a stall signal.

12. A processing system, comprising:
a processor operative to issue read requests, each read request containing an address identifying the data being requested;
a first memory coupled to the processor;
a second memory coupled to the first memory and to the processor; and
logic operative to:
determine whether a read address associated with a read request from the processor falls into a first logical address region that maps to a physical address region;
determine whether the address of the read request falls within a first logical address sub-region of the first logical address region;
determine whether the address of the read request falls within a second logical address sub-region of the first logical address region;
determine whether the read address falls into a second logical address region that maps to the physical address region;
determine whether the address of the read request falls within a first logical address sub-region of the second logical address region;
determine whether the address of the read request falls within a second logical address sub-region of the second logical address region;
determine whether the data associated with the read request resides in the first memory;
if the read address falls into the first logical address region and the requested data resides in the first memory, then (i) transfer the requested data from the first memory to the processor, and (ii) provide a first signal to the processor indicating that the requested data is being transferred to the processor in satisfaction of the read request;
if the read address falls into the first logical address region and the requested data does not reside in the first memory, then (i) initially provide a second signal to the processor indicating that the data is not being transferred to the processor in satisfaction of the read request;, (ii) if the read address falls within the first logical address sub-region of the first logical address region, then transfer a block of multiple data words including the requested data from the second memory to the first memory and transfer the requested data to the processor, (iii) if the read address falls within the second logical address sub-region of the first logical address region, then transfer only a single data word including the requested data from the second memory to the first memory and transfer the requested data to the processor, and (iv) upon transferring the requested data to the processor, provide the first signal to the processor indicating that the data is being transferred to the processor in satisfaction of the read request; and
if the read address falls into the second logical address region, then (i) provide the first signal to the processor indicating that the data is being transferred to the processor in satisfaction of the read request, (ii) if the read address falls within the first logical address sub-region of the first logical address region, then transfer a block of multiple data words including the requested data from the second memory to the first memory, and (iii) if the read address falls within the second logical address sub-region of the first logical address region, then transfer only a single data word including the requested data from the second memory to the first memory.

* * * * *